No. 839,215. PATENTED DEC. 25, 1906.
R. T. SIMMONS.
CHURN.
APPLICATION FILED JUNE 29, 1906.
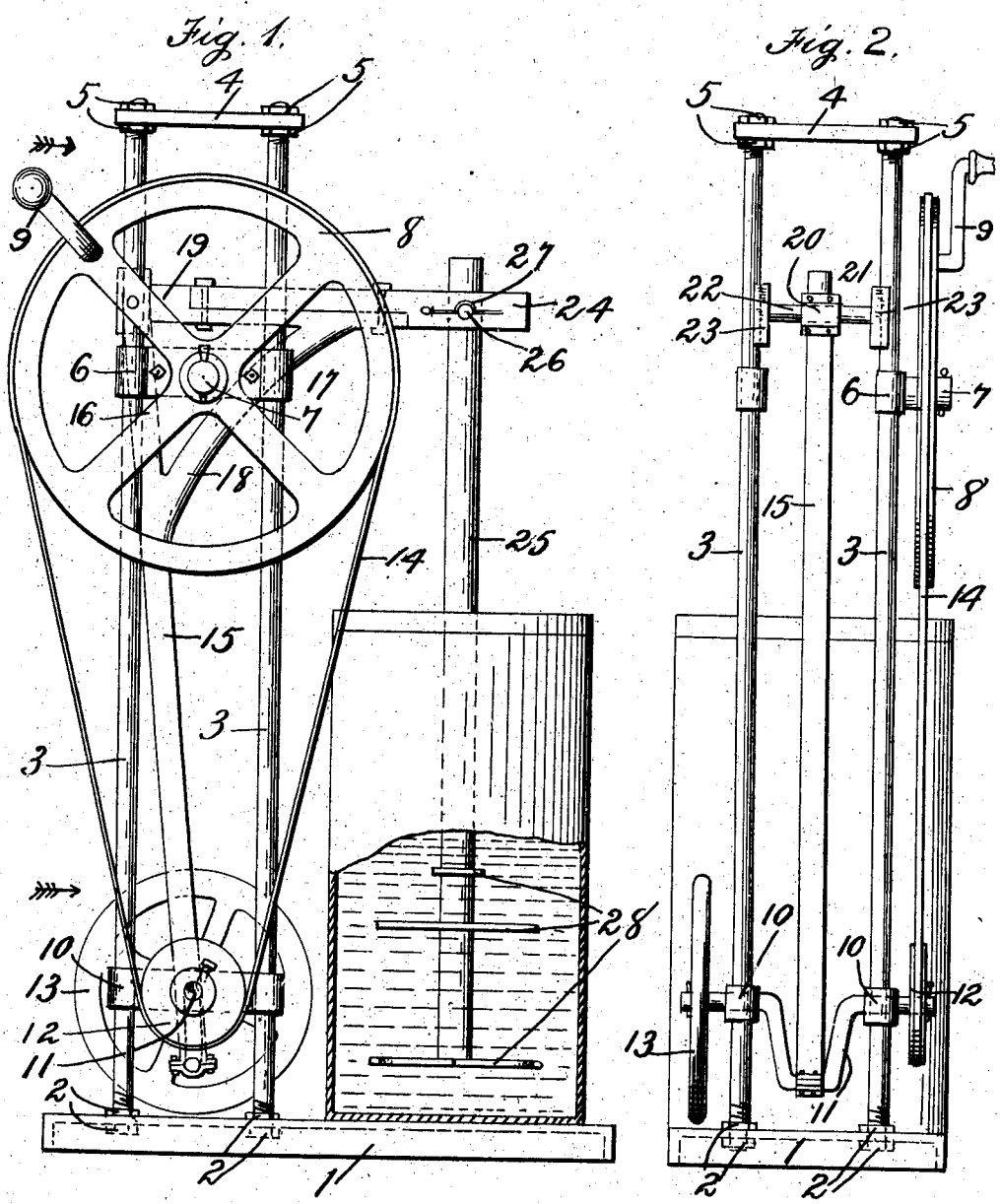
WITNESSES:
F. L. Ourand
J. P. Duffie
INVENTOR
Robert T. Simmons
By John S. Duffie
Attorney

UNITED STATES PATENT OFFICE.

ROBERT T. SIMMONS, OF WYNNE, ARKANSAS.

CHURN.

No. 839,215.  Specification of Letters Patent.  Patented Dec. 25, 1906.

Application filed June 29, 1906. Serial No. 324,083.

*To all whom it may concern:*

Be it known that I, ROBERT T. SIMMONS, a citizen of the United States, residing at Wynne, in the county of Cross and State of Arkansas, have invented certain new and useful Improvements in Churns, of which the following is a specification.

My invention has relation to new and useful improvements in churns, and has for its object the production of a machine of this character that may be readily and easily operated, is simple and economical in construction, efficient in operation, and capable of doing a maximum amount of work, and serve all the functions of any of the more complicated machines of this nature.

The invention essentially and substantially consists of an upright frame having mechanism for effecting a rectilinear reciprocating movement of a vertical dasher-rod carrying suitable dashers and adapted to work in suitable receptacles for receiving the cream to be churned.

With these ends in view my invention consists in the novel construction, combination, and arrangement of parts, as set forth in the specification and claims hereunto appended.

In the accompanying drawings, in which like parts are designated by like characters throughout both views, Figure 1 is a side elevation of my invention when ready for operation. Fig. 2 is an end view of Fig. 1 looking in the direction of the arrows.

My invention is described as follows:

The numeral 1 represents a suitable base for the churn. Removably secured at their lower threaded ends to the upper and lower face of the top of said base by nuts 2 are four vertical rods 3. Said rods are provided at their upper threaded ends with a cap 4, removably secured thereto by nuts 5. Secured horizontally near the upper ends of the foremost of said vertical rods 3 is a horizontal boxing 6, and journaled in said boxing is an axle 7, having rigidly connected thereto a belt-wheel 8, provided with crank-handle 9. Secured horizontally near the lower ends of said rods 3 are crank-boxings 10, and journaled at its ends in said boxings is a crank-shaft 11, having secured on its front end a pulley 12 and carrying a fly-wheel 13 on its opposite end. Running over said belt-wheel 8 and pulley 12 is an endless belt 14. Journaled at its lower end to the crank of said crank-shaft 11 is a substantially vertical rod 15. Said rod 15 terminates at its upper end in a fork comprising a straight portion 16 and oblique bracket-arm 17, consisting of a front oblique extension 18 and horizontal extension 19, provided with a hinged boxing 20, which is bolted around the central part of a slide 21, adapted to work up and down on the rearmost of said vertical rods 3. Said guide comprises a transverse rod 22, provided at its ends with vertical guide-blocks 23, provided in their outer faces with vertical concave recesses which conform with the curvature of said rods. When other rods 3 are employed instead of circular, the grooves or recesses of the guide-blocks are formed to correspond therewith. Bolted or otherwise suitably secured to said arm 17 is a horizontal member 24, bifurcated at its front end, and removably secured at its upper end in the fork of said horizontal member 24 is a vertical dasher-rod 25, provided with a horizontal pin 26 at its upper end. Said dasher-rod 25 is secured in the fork of said member 24 by passing the pin 26 thereof through a corresponding perforation in one of the members of the fork and employing a spring-wire 27, bent at its central part in semicircular form, which semicircular part of the spring-wire fits in a corresponding groove in the pin 26 of said dasher-rod and prevents the upper end of the same from working out of the fork of said member 24. The lower end of said dasher-rod is adapted to extend downward through the top or cover of a receptacle of wood, tin, glass, crockery, or other suitable material for holding the cream to be churned and is provided with the usual dashers 28, three in this case. I do not confine myself to any specific construction of dasher, but claim the right to use any construction that fairly falls within the scope of my invention.

The operation of my device is as follows: The cream to be churned is placed in a suitable receptacle, (see Fig. 1,) when the lower end of the dasher-rod is inserted therein and the upper end removably secured in the fork of horizontal member 24 in the manner above described. This done, the belt-wheel 8 is put in operation by means of the crank-handle 9, which drives the belt 14 over the belt-wheel 8 and effects the rotation of the pulley 12 and the crank-shaft 11. The rotation of the crank-shaft 11 imparts a reciprocating and substantial vertical movement to the rod 15, when the slide 21 works up and down on the rear vertical rods 3. The horizontal member 24 is carried up and down with the arm 17 of the rod 15 and imparts a reciprocating rectilinear movement to the dasher-rod, which effects the churning of the cream in the receptacle.

Having described my invention, what I claim as new, and desire to secure by Letters Patent, is—

1. In a churn, the combination of a base 1; vertical rods 3, their lower threaded ends removably secured to said base; cap 4, removably secured to the tops of said rods; boxing 6, secured horizontally near the upper ends of the foremost of said rods 3; axle 7, journaled in said boxing; belt-wheel 8, secured on said axle; crank-boxings 10, secured horizontally near the lower ends of said rods; crank-shaft 11, its ends journaled in said boxings; pulley 12, secured on the front ends of said crank-shaft; belt 14, running over said belt-wheel 8 and pulley 12; vertical rod 15, journaled at its lower end to the crank of said crank-shaft, and terminating at its upper end in a fork comprising a straight part 16 and bracket-arm 17; slide 21, comprising transverse rod 22 provided at its ends with vertical guide-blocks 23 having vertical recesses in their outer faces adapted to slide up and down on the rear vertical rods 3, the rear end of said bracket-arm hinged to the transverse rod 22 of said slide; horizontal member 24, bifurcated at its front end, secured to said bracket-arm, and dasher-rod 25, provided with a horizontal pin 26 near its upper end, and carrying suitable dashers at its lower end, removably secured in the fork of said member 24 at its upper end, its lower end adapted to work in a receptacle for containing the cream to be churned, substantially as shown and described.

2. In a churn, the combination of a base 1; upright frame, removably secured to said base; belt-wheel 8, secured on an axle removably journaled near the upper end and front part of said frame; crank-shaft 11, journaled horizontally near the lower end of said frame; pulley 12, secured on the front end of said crank-shaft; belt 14, running over said pulley and belt-wheel; vertical rod 15, journaled at its lower end to the crank of said crank-shaft, and terminating at its upper end in a fork comprising a straight part 16 and bracket-arm 17; slide 21, comprising transverse rod 22 provided at its end with vertical guide-blocks 23 having vertical recesses in their outer faces adapted to slide up and down on the rear part of said frame, the rear end of said bracket-arm hinged to the transverse rod of said slide; horizontal member 24, bifurcated at its front end, secured to said bracket-arm, and a dasher-rod 25, provided with a horizontal pin 26 near its upper end and carrying suitable dashers 28 near its lower end, removably secured in the fork of said member 24 at its upper end, its lower end adapted to work in a suitable receptacle, substantially as shown and described.

3. In a churn, the combination of a base; upright frame, removably secured on said base; crank-shaft, journaled horizontally near the lower end of said frame; means for rotating said crank-shaft; vertical rod, journaled at its lower end to the crank of said crank-shaft; means for preventing displacement of the upper end of said vertical rod; horizontal member, secured to the upper end of said vertical rod, and bifurcated at its front end; dasher-rod, provided with a horizontal pin near its upper end, secured in the fork of said horizontal member, said pin passing through a corresponding perforation in one of the arms of the fork, the lower end of said dasher-rod adapted to work in a receptacle, and dashers, secured to the lower end of said dasher-rod, substantially as shown and described.

4. In a churn, the combination of a base; upright frame, removably secured on said base; crank-shaft, journaled horizontally near the lower end of said frame; means for rotating said crank-shaft; vertical rod, journaled at its lower end to the crank of said crank-shaft; means for preventing displacement at the upper end of said rod; horizontal member, secured to the upper end of said vertical rod; dasher-rod, its upper end secured to the free end of said horizontal member, its lower end adapted to work vertically in a suitable receptacle, and dashers, secured to the lower end of said dasher-rod, substantially as described.

5. In a churn, the combination of a base; upright frame, mounted on said base; crank-shaft, journaled horizontally near the lower end of said frame; means for rotating said crank-shaft; vertical rod, journaled at its lower end to the crank of said crank-shaft; means for preventing displacement of the upper end of said vertical rod; dasher-rod, its lower end adapted to work vertically in a suitable receptacle; dashers, secured to the lower end of said dasher-rod, with means for connecting the upper end of said dasher-rod with the upper end of said vertical rod, substantially as shown and described and for the purposes set forth.

In testimony whereof I have signed my name to this specification in the presence of two subscribing witnesses.

ROBERT T. SIMMONS.

Witnesses:
E. H. LEYG,
W. W. SHAVER.